United States Patent Office 3,033,425
Patented May 8, 1962

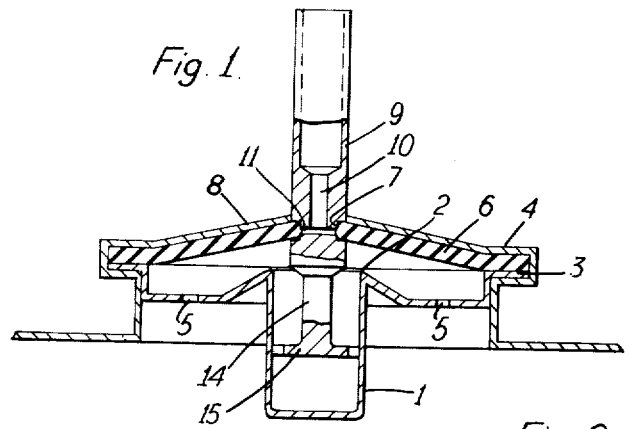
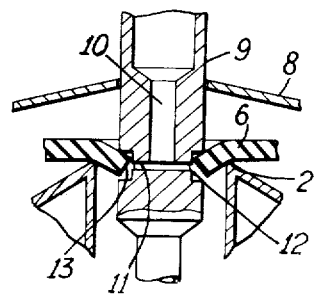
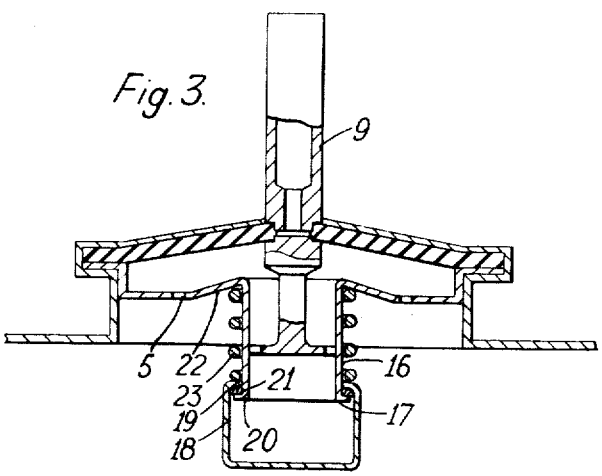

3,033,425
METERING DISPENSER FOR AEROSOL WITH DEPRESSIBLE DISCHARGE TUBE OPERATED FLEXIBLE DIAPHRAGM
Alan Gawthrop, Birstall, Leicester, England, assignor to Neotechnic Engineering Limited, Clitheroe, Lancashire, England, a British company
Filed Nov. 9, 1959, Ser. No. 851,678
11 Claims. (Cl. 222—335)

This invention is for improvements in or relating to dispensing devices for aerosols and has for an object to provide a metering valve for delivering metered quantities of an aerosol composition.

Aerosol compositions generally are of two kinds, namely those in which the composition contains a propellant liquid which vaporises very rapidly when the composition it at atmospheric pressure, and those in which the propulsion of the aerosol composition is effected by maintaining the liquid composition in a container under the pressure of a permanent gas, such as nitrogen.

Various prior constructions have been proposed for the dispensing of metered quantities of aerosol compositions having a number of moving parts and co-operating valves and it is an object of the present invention to provide a simplified construction of dispensing device for the delivery of metered quantities, particularly for the dispensing of aerosol compositions of the type which are ejected by the use of the pressure of a permanent gas.

According to the present invention a dispensing device for delivering metered quantities of an aerosol composition comprises a metering chamber closed at its lower end and arranged to communicate with the interior of the container at its open upper end and preferably formed with an upstanding rim at the upper end thereof and a discharge tube mounted in a rubber or like elastic sealing washer secured to the open mouth of a container whereby the container is sealed from the atmosphere, said discharge tube having an axial bore extending along a part only of its length from the upper end thereof and communicating with a transverse inlet port or ports formed in the side wall of the discharge tube, the diameter of the discharge tube being reduced in the neighbourhood of the port or ports to form a circumferential recess for receiving the edge of said sealing washer whereby the port or ports is or are sealed by the sealing washer, the discharge tube being axially movable together with the sealing washer towards the open end of the chamber to a position in which the washer seals the open end of the metering chamber for example, by engagement with the upstanding rim thereon, whereafter further movement of the discharge tube flexes the washer whereby its inner edge is tilted to uncover the said port or ports to vent the contents of the metering chamber to atmosphere through said axial bore.

It will be seen that with a construction in accordance with the invention the apparatus comprises only a single moving part and the valving is effected by a single washer which carries the discharge tube and which, at the same time, fulfils the function of sealing the metering chamber from the body of the container. Moreover, there are no sliding valves as are commonly present in prior proposals for metering valves. In order to minimise any sideways movement of the discharge tube it is preferred that the tube have an extension at its lowermost end which projects into the metering chamber and is provided with an enlarged end portion cooperating with the sides of the metering chamber to form a guide. In the simplest form of construction, the metering chamber is formed with an integral, fixed lower end wall and in this form of construction the metering valve is capable of dispensing those aerosol compositions which contain a propellant liquid as referred to above.

By a small modification of the foregoing construction the metering valve of the present invention can be adapted for use with those aerosol compositions which are ejected by the pressure of a permanent gas within the container. In this modification it is a feature of the invention that the lower end of the metering chamber is closed by means of a piston member spring-biassed in a direction away from the open end of the chamber; the said piston member may be disposed to lie wholly within the lower end of the metering chamber or, in the alternative, it may be in the form of a cup-shaped member whose side walls slide in liquid-tight manner over the outer wall of the metering chamber.

In the modified form of construction using an aerosol composition and a permanent gas under pressure in the container, the piston, being spring-biassed away from the open upper end of the metering chamber, is retained in its lowest position so that the metering chamber becomes filled with the aerosol liquid.

On depression of the discharge tube, the sequence of operations is the same as with the first construction, up to the point at which the discharge tube is moved beyond the point at which the washer is sealed against the upper open end of the metering chamber, but when the discharge tube is depressed beyond this point, so that the washer is flexed to uncover the port or ports, the ejection of the contents of the metering chamber arises by reason of the fact that, as soon as the interior of the metering chamber is placed into communication with the outside atmosphere, there is a pressure differential between the two sides of the piston member, as a result of which the piston member is forced in a direction towards the open upper end of the metering chamber, thereby ejecting a quantity of the aerosol composition corresponding to the volume displaced by the movement of the piston. When the metered quantity has been ejected from the metering chamber, the discharge tube is released, whereupon the sequence of operations is again similar to the first-described construction, namely that, first, the washer seals the port or ports in the discharge tube, and thereafter unseals the open upper end of the metering chamber so that the aerosol composition under the pressure of the permanent gas within the container, enters into the metering chamber, the piston being returned to its initial position under the influence of the spring.

The invention is illustrated in the accompanying drawings in which:

FIGURE 1 is a diagrammatic cross-sectional view of one embodiment of dispensing device in accordance with the invention, FIGURE 2 is an enlarged view of a portion of the device of FIGURE 1 in the position for discharge of the aerosol composition, and FIGURE 3 is a diagrammatic cross-sectional view of the modification of the construction of FIGURE 1.

The following is a description of the first embodiment of the invention referred to above illustrated in FIGURES 1 and 2.

A metering chamber is formed, for example, by pressing from sheet metal, to provide a cylindrical metering chamber 1, closed at its lower end and formed with an upstanding rim 2 at its upper open end. The upper end is connected with a transversely extending flange 3 adapted to be clamped in position in a cap 4 mounted on the container and the transversely extending flange 3 is formed with one or more ports 5 providing for communication between the interior of the container and the interior of the metering chamber 1.

Disposed so as to lie on top of the transverse flange 3 carrying the metering chamber 1, there is provided a thick rubber or like elastic washer 6, which is secured in liquid-tight manner against the periphery of the said transverse flange 3 by being crimped or otherwise secured within the cap 4. The washer 6 is formed with a hole 7 in its centre and in this hole there is disposed the discharge tube 9; the washer is supported when in an outwardly deflected position as shown in FIGURE 1 by an inward extension 8 of the cap 4 of the container.

The discharge tube 9 is formed with an axial bore 10 extending partly along its length, the bore 10 communicating with a transverse passage 11 extending through the discharge tube 9 which is, at this point, of reduced cross-section by reason of a circumferential recess 12 being formed in the exterior wall of the discharge tube 9; the longitudinal length of the circumferential recess 12 is approximately equal to the thickness of the washer 6 which is accommodated within the recess 12 with the end wall 13 thereof in sealing engagement with the said transverse passage 11. The position of the discharge tube 9 and the washer 6 when the former has been depressed beyond the point at which the metering chamber 1 by engagement with the rim 2 is best understood from FIGURE 2 which shows the passage 11 uncovered. Below the point at which the transverse passages 11 are formed in the discharge tube 9 is an extension 14 which, at its lowest extremity, is provided with an enlarged portion 15 in the form of a star or the like, the dimensions thereof being such that the outer periphery of the enlarged lower portion 15 of the discharge tube 9 is in free sliding engagement with the interior surface of the metering chamber 1, thereby minimising any tendency for the discharge tube 9 to rock.

The operation of the valve having been already described above, it suffices to say that, in the construction as described, the aerosol container would be used in the inverted position, whilst if required for use in the normal upright position, the provision of a dip tube (not shown) is necessary in order to provide for a passage for the liquid from the container upwardly through the port or ports in the said transverse flange.

In the modification of the foregoing construction above referred to and illustrated in FIGURE 3, the metering chamber 16 is formed with an open lower end 17 and a cup-shaped piston member 18 formed, with an inturned upper edge 19, is mounted to slide over the exterior surface of the metering chamber 16 and, in order to seal it to the metering chamber, the latter is formed with a slight radially extending flange 20 upon which is located a rubber O-ring 21. Disposed between the inturned flange 19 of the cup member 18 and the under surface of the transverse flange 22 associated with the metering chamber 16, there is disposed a spring 23 of a strength sufficient to return the cup-shaped member 18 to its lowermost position when the discharge tube 9 is returned to its normal position, thereby relieving the interior of the metering chamber 16 so that the pressure therein can return approximately to the pressure exerted by the permanent gas within the container. Apart from the modification just mentioned, namely the open lower end of the metering chamber and the piston member associated therewith, the construction is otherwise the same as described in connection with the first embodiment and it can likewise be used in the inverted position or, if provided with a dip-tube arrangement, can be utilized in its normal position.

Various modifications may be made to the constructions described above, for example, instead of utilising a cup-shaped member, to constitute the piston as referred to in the description of the second embodiment, an internally-disposed piston may be utilised with an appropriate modification in the disposition of the return spring.

The term "aerosol composition" as employed herein, includes compositions other than simple liquids such as pastes, which may be discharged in the form of a coherent ribbon or stream, and viscous liquids which may be discharged in the form of a jet or a series of large drops and is not limited to compositions which are discharged in the form of the very minute droplets normally referred to as aerosols in the art to which the present invention relates.

Usually, the discharge tube will be provided with an actuator in the form of a nozzle member so constructed as to discharge the aerosol composition in the form of a jet, spray or ribbon and to provide a conveniently shaped end part to which manual pressure can be applied to operate the valve.

I claim:

1. A dispensing device for delivering metered quantities of an aerosol composition from a container having a top wall provided with an opening, comprising, a metering chamber having an open upper end and a closed lower end, means mounting the open end of the metering chamber to said container top wall, means at said open upper end providing communication between said metering chamber and the container interior, a flexible elastic sealing washer having an axial aperture therein and mounted between said top wall and said open upper end, and a discharge tube mounted on said washer for axial reciprocation therewith, said discharge tube being slidingly mounted in said container top wall opening, said discharge tube having an axial bore extending along only a part of its length from the upper end thereof and having a passage extending transversely of said bore with which said axial bore is in communication, said transverse passage being open at the peripheral wall of said tube, the external diameter of said tube being reduced in the vicinity of said passage to form a circumferential recess to receive the circumferential wall of the axial aperture of the washer therein, whereby the open end of said passage is sealed by said circumferential wall and whereby said recess provides the mounting of said tube on said washer in the aperture, the discharge tube being axially movable, together with said washer, towards said open upper end of said chamber to a position wherein said washer seals said open upper end, further movement in the same direction flexing the washer adjacent its aperture so that said circumferential wall is tilted to uncover the open end of said passage affording communication between said chamber and the atmosphere through said bore thus discharging the quantity of aerosol composition trapped in said chamber at the time of sealing of said chamber by said washer.

2. A dispensing device according to claim 1 wherein the metering chamber has an upstanding rim at the upper end thereof with which the sealing washer can engage and disengage.

3. A dispensing device according to claim 2, wherein the metering chamber has an integral, fixed lower end wall.

4. A dispensing device according to claim 3, wherein the discharge tube has an extension at its lowermost end which projects into the metering chamber and is provided with an enlarged end portion co-operating with the sides of the metering chamber to form a guide.

5. A dispensing device according to claim 1, wherein the lower end of the metering chamber is closed by means of a piston member spring-biassed in a direction away from the open end of the chamber.

6. A dispensing device according to claim 5, wherein the piston member is disposed to lie wholly within the lower end of the metering chamber.

7. A dispensing device according to claim 5, wherein the discharge tube has an extension at its lowermost end which projects into the metering chamber and is provided with an enlarged end portion co-operating with the sides of the metering chamber to form a guide.

8. A dispensing device according to claim 5, wherein the piston member is in the form of a cup-shaped member whose side walls slide in liquid-tight manner over the outer wall over the metering chamber.

9. A dispensing device according to claim 8, wherein the discharge tube has an extension at its lowermost end which projects into the metering chamber and is provided with an enlarged end portion co-operating with the sides of the metering chamber to form a guide.

10. A dispensing device according to claim 5, wherein the metering chamber is formed with an upstanding rim at the upper end thereof for engagement with the sealing washer.

11. A dispensing device according to claim 8, wherein the metering chamber is formed with an upstanding rim at the upper end thereof for engagement with the sealing washer.

References Cited in the file of this patent

UNITED STATES PATENTS

| | | |
|---|---|---|
| 1,870,188 | Abrams | Aug. 2, 1932 |
| 2,746,796 | St. Germain | May 22, 1956 |
| 2,812,884 | Ward | Nov. 12, 1957 |
| 2,835,417 | Kiraly | May 20, 1958 |
| 2,890,817 | Rheinstrom | June 16, 1959 |